United States Patent
Wen

(10) Patent No.: US 8,705,230 B2
(45) Date of Patent: Apr. 22, 2014

(54) HARD DISC DEVICE

(75) Inventor: Wu-Tsung Wen, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 354 days.

(21) Appl. No.: 13/278,182

(22) Filed: Oct. 21, 2011

(65) Prior Publication Data

US 2012/0145575 A1    Jun. 14, 2012

(30) Foreign Application Priority Data

Dec. 14, 2010    (TW) .................................. 99143766 A

(51) Int. Cl.
*G06F 1/16*    (2006.01)
*G11B 33/12*    (2006.01)

(52) U.S. Cl.
CPC ............ *G11B 33/124* (2013.01); *G11B 33/128* (2013.01)
USPC .................................................. 361/679.38

(58) Field of Classification Search
CPC .... G11B 33/124; G11B 33/128; B65D 85/00; G06F 1/187
USPC ............. 361/679.38, 679.37, 679.39, 679.33; 206/307
See application file for complete search history.

(56) References Cited

U.S. PATENT DOCUMENTS

| | | | | |
|---|---|---|---|---|
| 5,305,180 A | * | 4/1994 | Mitchell et al. | 361/679.37 |
| 5,319,519 A | * | 6/1994 | Sheppard et al. | 361/679.39 |
| 5,692,208 A | * | 11/1997 | Felcman et al. | 361/679.38 |
| 5,797,667 A | * | 8/1998 | Wu | 312/332.1 |
| 5,812,370 A | * | 9/1998 | Moore et al. | 361/679.38 |
| 5,825,616 A | * | 10/1998 | Howell et al. | 361/679.38 |
| 6,411,505 B1 | * | 6/2002 | DiFonzo et al. | 361/679.38 |
| 6,643,139 B2 | * | 11/2003 | Tien | 361/727 |
| 7,983,000 B2 | * | 7/2011 | Chen et al. | 360/99.14 |
| 8,259,441 B2 | * | 9/2012 | Chuang | 361/679.31 |
| 8,369,080 B2 | * | 2/2013 | Huang | 361/679.38 |
| 8,514,562 B2 | * | 8/2013 | Lin et al. | 361/679.31 |
| 2008/0123279 A1 | * | 5/2008 | Chih et al. | 361/685 |
| 2011/0073734 A1 | * | 3/2011 | Chang | 248/309.1 |
| 2011/0299237 A1 | * | 12/2011 | Liang | 361/679.38 |
| 2012/0147547 A1 | * | 6/2012 | Lin et al. | 361/679.31 |
| 2012/0320521 A1 | * | 12/2012 | Gong et al. | 361/679.38 |

FOREIGN PATENT DOCUMENTS

| | | |
|---|---|---|
| TW | 432753 | 5/2001 |
| TW | 476438 | 2/2002 |

(Continued)

OTHER PUBLICATIONS

"Office Action of Taiwan Counterpart Application", issued on Jan. 13, 2014, p1-p5, in which the listed references were cited.

*Primary Examiner* — Lisa Lea Edmonds

(74) *Attorney, Agent, or Firm* — Jianq Chyun IP Office

(57) ABSTRACT

A hard disc device including a frame, a hard disc, a pushing rod and a door is provided. The frame has a pair of troughs interior. The hard disc is movably disposed in the frame and leans against the troughs. The pushing rod disposed outside the frame has a first end and a second end. The second end extends along external of the frame. The door has a third end and a fourth end, wherein the fourth end is disposed at the frame, such that the third end rotates relative to the fourth end. The fourth end has a cam leaning against the second end of the rod.

4 Claims, 4 Drawing Sheets

(56) References Cited

FOREIGN PATENT DOCUMENTS

| TW | 511728 | 11/2002 |
|----|--------|---------|
| TW | M302230 | 12/2006 |
| TW | M319439 | 9/2007 |
| TW | M325586 | 1/2008 |
| TW | M326203 | 1/2008 |
| TW | M340488 | 9/2008 |
| TW | M370153 | 12/2009 |

* cited by examiner

HARD DISC DEVICE

CROSS-REFERENCE TO RELATED APPLICATION

This application claims the priority benefit of Taiwan application serial no. 99143766, filed on Dec. 14, 2010. The entirety of the above-mentioned patent application is hereby incorporated by reference herein and made a part of this specification.

BACKGROUND OF THE INVENTION

1. Field of the Invention

The invention relates to a hard disc device. More particularly, the invention provides a hard disc device related to material saving.

2. Description of Related Art

As the progress of science and technology, computer has already become an essential tool in our daily life. Generally speaking, the most important data access and storage device in the computer is hard disc. The hard disc device comprises advantages of low price, high velocity and large storage capacities. In addition, hard disc may store operation system, application programs, and user's data.

Generally speaking, hard disc is usually reparably installed on the frame to compose a hard disc device, thus it may be attached or detached from the frame. Additionally, the hard disc device also provides a draw out mechanism for the hard disc contact, and the user may conveniently operate this mechanism to draw the hard disc out of the frame. However, the draw out mechanisms these hard disc devices currently applied needed a plurality of elements, that causes the relationships between these elements very complicated, and virtually dissipated the materials cost and efforts.

SUMMARY OF THE INVENTION

According to an exemplary embodiment of the invention provides a material-saving hard disc device.

This disclosure provides a hard disc device, comprising a frame, a hard disc, a pushing rod and a door; wherein the frame has a pair of troughs interior. The hard disc is movably disposed in the frame and leans against the troughs. The pushing rod disposed outside the frame has a first end and a second end, the second end extends along external of the frame. The door has a third end and a fourth end, wherein the fourth end is pivoted to the frame, such that the third end rotates relative to the fourth end. The fourth end has a cam leaning against the second end of the rod.

In an embodiment of the invention, the aforementioned frame includes a first sidewall, a second sidewall and a connection portion. The second sidewall is opposed to the first sidewall, and the connection portion connects the first sidewall and the second sidewall, wherein the first sidewall and the second sidewall individually has a trough disposed correspondingly. In addition, the first sidewall even possesses a recess located at the first sidewall relatively away from the door, and the first end of the pushing rod extends along the internal of the frame, and disposed in the recess.

In an exemplary embodiment in this disclosure, the aforementioned door comprises a main body, a axle, and a fastener, wherein the third end and the fourth end are located at the main body, and the axle passes through the fourth end, such that the fourth end pivots to the frame. The fastener is disposed at the third end, and the second sidewall possesses a position limiting structure for limiting the fastener. Additionally, the door even comprises a spring disposed between the fastener and the main body.

Accordingly, the door of the hard disc device possesses the cam against the second end of the pushing rod, thus while the third end rotates relative to the fourth end, the cam rotates to drive the pushing rod to move, such that the first end of the pushing rod contacts and pushes the hard disk; thus a user conveniently draws the hard disc out of the frame.

In order to make the aforementioned features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
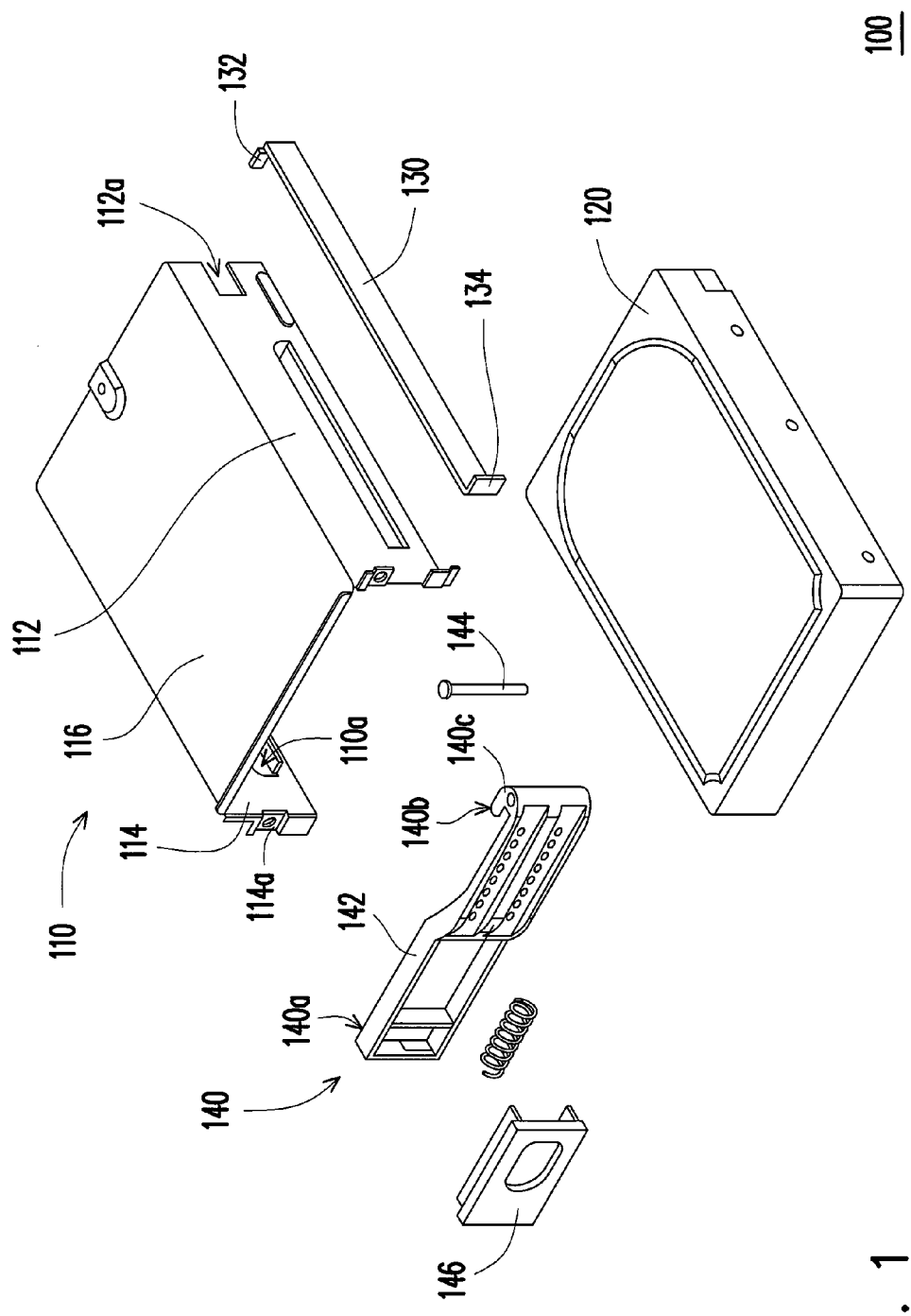
FIG. 1 is an exploded schematic view of a hard disc device according to one embodiment of the invention.
Figure 2:
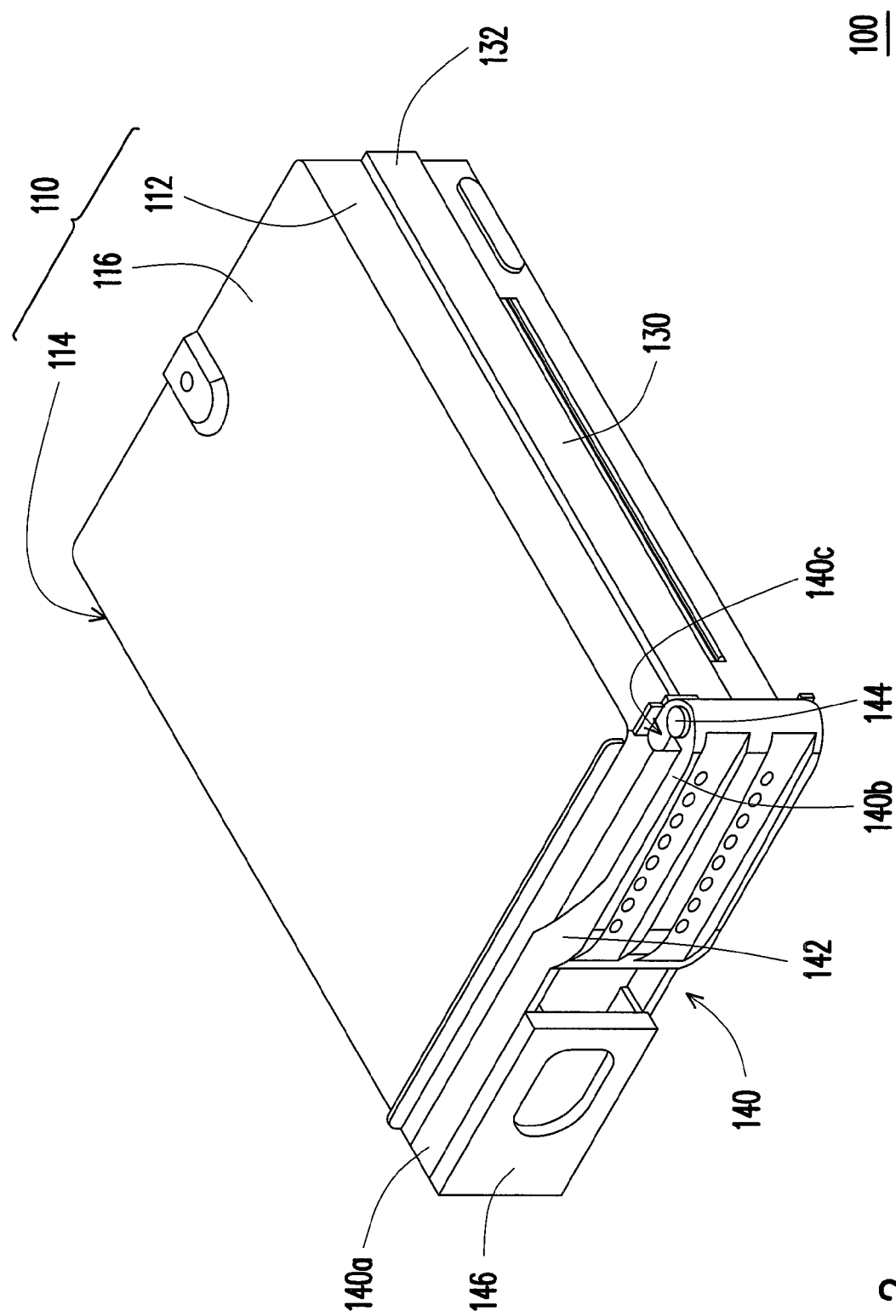
FIG. 2 is a schematic view showing an assembly of the hard disc device of FIG. 1.
Figure 3:
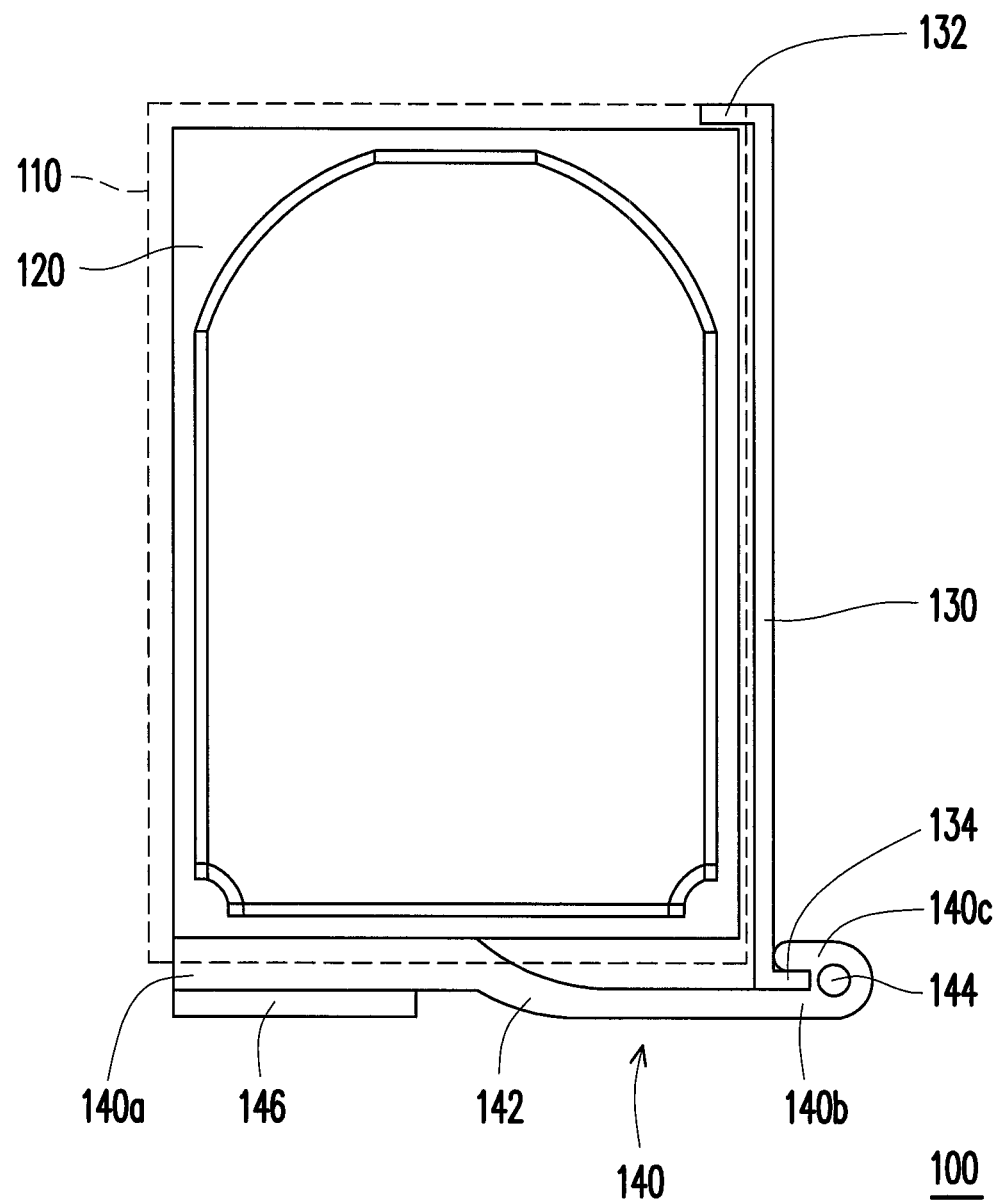
FIG. 3 is a top view of FIG. 2.

FIG. 1 is an exploded schematic view of a hard disc device according to one embodiment of the invention, FIG. 2 is a schematic view showing an assembly of the hard disc device of FIG. 1, and FIG. 3 is the top view of FIG. 2, wherein for the conveniently explanation, FIG. 2 and FIG. 3 ignore the diagram illustrating to the frame. The hard disc device 100, for example, applied to a server, comprises a frame 110, a hard disc 120, a pushing rod 130, and a door 140, wherein the frame 110 has a pair of troughs 110a (only one trough shown in FIG. 1). The hard disc 120 is movably disposed in the frame 110 and leans against the troughs 110a of the frame 110. The pushing rod 130 disposed outside the frame 110, wherein the pushing rod has a first end 132 and a second end 134, and the second end 134 of the pushing rod 130 extends along external of the frame 110. The door 140 has a third end 140a and a fourth end 140b, wherein the fourth end 140b is pivoted to the frame 110, such that the third end 140a relatively applies the fourth end 140b as the rotating axle for opening or closing relative to the frame 110, this fourth end 140b possesses a cam 140c, and the cam 140c leans against the second end 134 of the pushing rod 130.

Specifically, the frame 110 includes a first sidewall 112, a second sidewall 114, and a connecting portion 116. The second sidewall 114 is opposed to the first sidewall 112, and the connecting portion 116 attached between the first sidewall 112 and the second sidewall 114, wherein the first sidewall 112 and the second sidewall 114 individually has a trough 110a, and two troughs 110a disposed to the corresponding positions. Moreover, the first sidewall 112 even has a recess 112a located at the first sidewall 112 respectively far away from the door 140, and the first end 132 of the pushing rod 130 extends along internal of the frame 110, located in the recess 112a.

As above mentioned, the door 140 comprises a main body 142, an axle 144, and a fastener 146, wherein the third end 140a and the fourth end 140b located at the main body 142, and the axle 144 passes through the fourth end 140b, such that the fourth end 140b is pivoted to the frame 110. The fastener 146 is disposed at the third end 140a, and the second sidewall 114 has a position limiting structure 114a, which is suitably connected to the fastener 146.

Please simultaneously refer to FIG. 1, FIG. 2, and FIG. 3, while the door 140 is shut relatively frame 110, the fastener 146 closed as the position limiting structure 114a, that may limit the fastener 146 in an unpredicted situation to open the frame 110, that limits the hard disc 120 in the frame 110.

Figure 4:
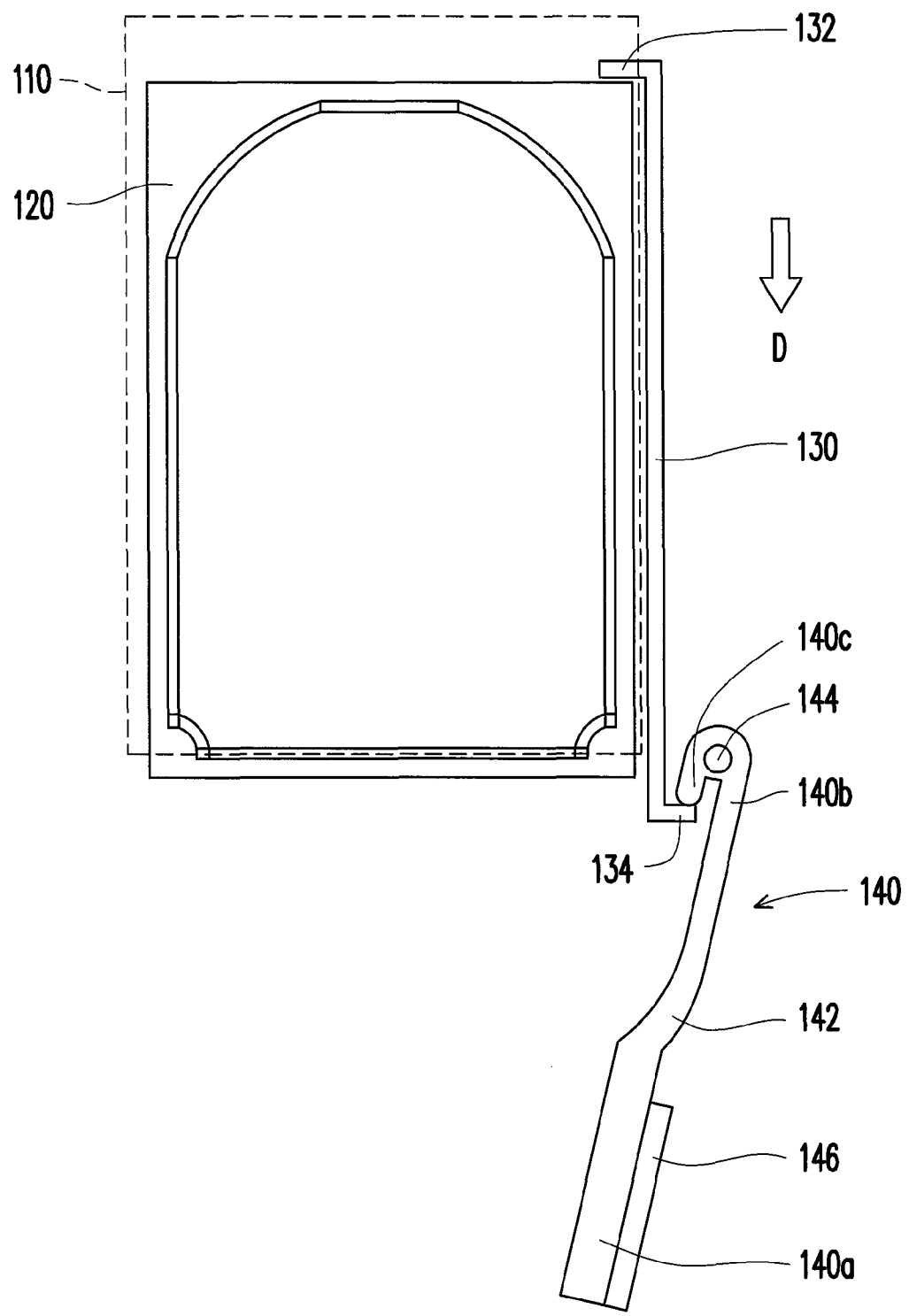
FIG. 4 is a schematic view of a pushing rod pushing the hard disc out of the frame.

FIG. 4 is a schematic view of a pushing rod pushing the hard disc out of the frame. Please simultaneously refer to FIG. 1, FIG. 3, and FIG. 4, when a user intends to draw the hard disc 120 out from the frame 110, the user first removes the fastener 146 of the door 140 from the position limiting structure 114a of the second sidewall 114 of the frame 110. Then, move the third end 140a of the door 140, such that the third end 140 rotates by applying the fourth end 140b as a rotation axle, and thus the third end 140 opens relative to the frame 110. Thereinafter, the second end 134 of the pushing rod 130 against the cam 140c of the fourth end 140b may push the second end 134 moving along a detachable direction D, and the first end 132 contacts the hard disc 120, and the first end 132 pushes hard disc 120 to move along the detachable direction D, a portion of the hard disc 120 is exposed out of the frame 110. Thereafter, the user may conveniently remove the hard disc 120 from the frame 110.

Compared with the convention, the fourth end 140b of the door 140 in the exemplary embodiments has the cam 140c to push the second end 134 of a pushing rod 130 while the fourth end 140b rotates, so it doesn't need to dispose extra elements those to push the second end 134 of the second end 130 between the second end 134 of the pushing rod 130 and the fourth end 140b of the door 140. Briefly, the amount of the elements applied in the hard disc 100 in the exemplary embodiment is less than the convention, and the element structure is simple (the cam 140c is directly disposed at the fourth end 140b of the door 140 to move the second end 134 of the pushing rod 130), thus it has the advantages of saving material cost, efforts and working hour.

To conclude, the hard disc device in the disclosure to the user possesses the convenient feature that may be easily drawn out of the frame. Additionally, the hard disc device applies the less number of elements, and the element structure is simple, thus has the advantages of easily fabricating, saving material cost, efforts and working hour.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A hard disc device, comprising:
   a frame, comprising a pair of troughs;
   a hard disc, movably disposed in the frame, and leaning against the pair of troughs;
   a pushing rod disposed outside the frame, having a first and a second end; wherein the second end extends along external of the frame; and
   a door having a third end and a fourth end, wherein the fourth end is installed on the frame, such that the third end opens or closes relative to the frame using the fourth end as a rotating axle, the fourth end having a cam leaning against the second end of the pushing rod.

2. The hard disc device according to claim 1, wherein the frame comprises:
   a first sidewall;
   a second sidewall, opposed to the first sidewall, wherein the first sidewall and the second sidewall individually has one of the pair of troughs; and
   a connecting portion, connected between the first sidewall and the second sidewall.

3. The hard disc device according to claim 2, wherein the first sidewall even has a recess, located at a location of the first sidewall relatively far away from the door, and the first end of pushing rod extending along internal of the frame is located in the recess.

4. The hard disc device according to claim 1, wherein the door comprises:
   a main body, the third end and the fourth end both located at the main body;
   an axle, passing through the fourth end, such that the fourth end pivoted to the frame; and
   a fastener disposed at the third end, and the second sidewall has a position limiting structure suitable for limiting the fastener.

* * * * *